(12) United States Patent
Matsui

(10) Patent No.: US 10,181,779 B2
(45) Date of Patent: Jan. 15, 2019

(54) LAUNCHING APPARATUS FOR UNDERWATER PAYLOAD

(71) Applicant: Kobe Steel, Ltd., Hyogo (JP)

(72) Inventor: Hiroyoshi Matsui, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 348 days.

(21) Appl. No.: 15/177,537

(22) Filed: Jun. 9, 2016

(65) Prior Publication Data
US 2016/0372999 A1   Dec. 22, 2016

(30) Foreign Application Priority Data

Jun. 19, 2015   (JP) .................... 2015-124059

(51) Int. Cl.
| H02K 41/02 | (2006.01) |
| F41F 3/10 | (2006.01) |
| F41F 3/08 | (2006.01) |
| H02K 7/14 | (2006.01) |
| F41B 6/00 | (2006.01) |

(52) U.S. Cl.
CPC ............ *H02K 41/02* (2013.01); *F41F 3/08* (2013.01); *F41F 3/10* (2013.01); *H02K 7/14* (2013.01); *F41B 6/003* (2013.01)

(58) Field of Classification Search
CPC .......... H02K 41/02; H02K 7/14; H02K 11/00; F41F 3/08; F41F 3/10; F41F 3/00; B63H 11/02; B63H 11/00; F41B 6/00
See application file for complete search history.

(56) References Cited

U.S. PATENT DOCUMENTS

| 2,837,971 A | 6/1958 | Wosak |
| 4,971,949 A * | 11/1990 | Laskaris .............. F41B 6/00 |
| | | 114/238 |
| 5,168,118 A * | 12/1992 | Schroeder .......... F41B 6/00 |
| | | 124/3 |

(Continued)

FOREIGN PATENT DOCUMENTS

JP   2936079 B2   8/1999

OTHER PUBLICATIONS

The extended European search report issued by the European Patent Office on Nov. 7, 2016, which corresponds to European Patent Application No. 16173235.9-1655 and is related to U.S. Appl. No. 15/177,537.

*Primary Examiner* — Thomas Truong
*Assistant Examiner* — Leda T Pham
(74) *Attorney, Agent, or Firm* — Studebaker & Brackett PC

(57) ABSTRACT

Provided is a launching apparatus capable of efficiently obtaining water pressure sufficient for launching an underwater payload, including a launch tube, a conduit including a first end portion and a communicating portion communicating with the launch tube, a plurality of conduit coils to axially aligned in a first region between the first end portion and the communicating portion, a plurality of main circuits passing an electric current through respective conduit coils, and a main-circuit control section. The main-circuit control section controls operation of the main circuits to pass electric currents through the conduit coils to generate an axial first magnetic field in the conduit and thereby cause an axial second magnetic field in a moving object, thereby moving the moving object in an advance direction toward a second end portion.

8 Claims, 10 Drawing Sheets

(56) References Cited

U.S. PATENT DOCUMENTS

| | | | | |
|---|---|---|---|---|
| 5,284,106 A | * | 2/1994 | Meng | B63H 11/025 |
| | | | | 114/238 |
| 6,854,409 B1 | * | 2/2005 | Galliano | B63G 8/32 |
| | | | | 114/238 |
| 2010/0300274 A1 | * | 12/2010 | Root, Jr. | F41B 6/003 |
| | | | | 89/1.814 |
| 2014/0060508 A1 | * | 3/2014 | Floyd | F41B 6/003 |
| | | | | 124/3 |

* cited by examiner

LAUNCHING APPARATUS FOR UNDERWATER PAYLOAD

TECHNICAL FIELD

The present invention relates to a launching apparatus for underwater payloads.

BACKGROUND ART

Japanese Patent No. 2936079 (Patent Literature 1) discloses a launching apparatus for underwater payloads, the apparatus including a launch tube in which an underwater payload is loaded and a water supply device that supplies boosted water to the launch tube. The water supply device includes a pneumatically-driven turbine, which includes an impellers rotated underwater to increase water pressure.

U.S. Pat. No. 2,837,971 (Patent Literature 2) discloses a launching apparatus for underwater payloads, the apparatus including a launch tube in which an underwater payload is loaded and a conduit communicating with the launch tube. The conduit is filled with water and a piston is disposed therein. The piston is pneumatically driven to reciprocally move in the conduit, thereby increasing water pressure in the conduit.

The apparatuses using pneumatic pressure as explained above involves conversion of pressure energy of the air into operation energy for actuating the turbine and the piston, while having a possibility of failing to convert a part of the pressure energy into the operation energy. The pressure energy failed to be converted into the operation energy changes to, for example, vibration energy, causing radiation noise.

For the reason, has been proposed an apparatus that increases water pressure by use of an electromagnetic force instead of the pneumatic pressure. For example, U.S. Pat. No. 5,284,106 (Patent Literature 3) discloses an apparatus that passes an electric current through water (seawater) in a conduit to generate an electromagnetic force, which flows the water in one direction to increase the pressure of the water.

The technique for passing the electric current through the water (the seawater) in the conduit to generate the electromagnetic force, however, involves a problem that the electric resistance of the water (the seawater) affects the generation of the electromagnetic force to prevent water pressure from being sufficiently increased. Applying an excessively high voltage for obtaining a large electromagnetic force enough to overcome the electric resistance may involve electrolysis of the water (the seawater) in the conduit.

SUMMARY OF INVENTION

It is an object of the present invention to provide an apparatus for launching underwater payloads with water pressure, the apparatus being capable of efficiently obtaining sufficient water pressure for launching the underwater payload regardless of electric resistance of water.

Provided is a launching apparatus for underwater payloads, including: a launch tube in which an underwater payload is loaded; a conduit including a first end portion, which is one of axially opposite ends, and a communicating portion located in a position separate from the first end portion and communicating with the launch tube, the conduit being filled with water; a plurality of conduit coils disposed around the conduit in a first region between the communicating portion and the first end portion, the plurality of conduit coils aligned axially of the conduit; a plurality of main circuits configured to pass an electric current through the conduit coils, respectively, so as to generate an axial first magnetic field in the conduit; a main-circuit control section configured to control an operation of each of the plurality of main circuits; and a moving object disposed in the conduit and including a magnetic material or an induction coil, the moving object being configured to move in the conduit in an advance direction from the first end portion toward the communicating portion to thereby generate, in the launch tube, water pressure for launching the underwater payload. The main-circuit control section controls the operation of each of the plurality of main circuits such that the main circuits pass electric currents through the conduit coils corresponding to the main circuits, respectively, to generate the axial first magnetic field and to thereby cause an axial second magnetic field in the moving object, the first magnetic field and the second magnetic field making an interaction which moves the moving object in the advance direction.

DESCRIPTION OF EMBODIMENTS

There will be explained below preferred embodiments of the present invention.

Figure 1:
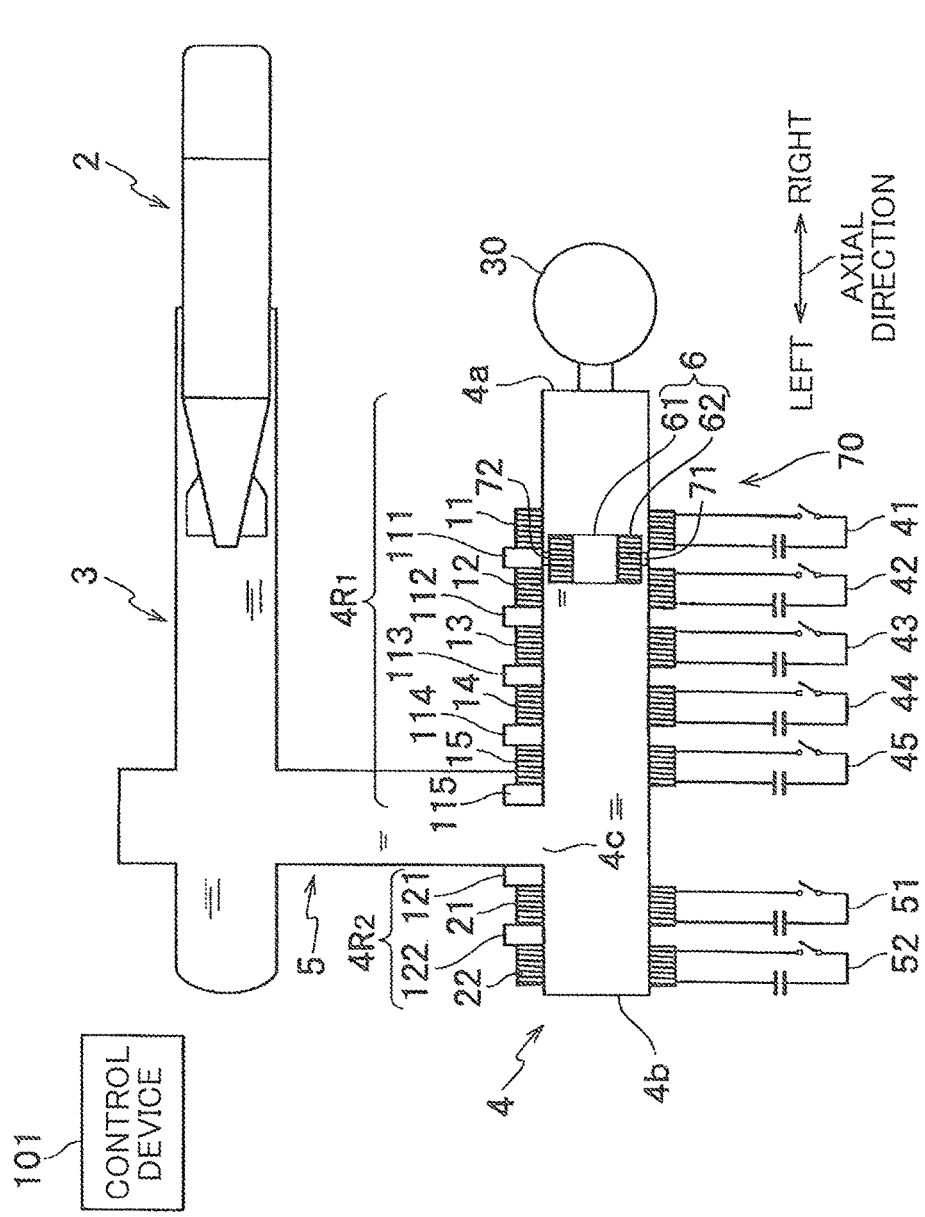
FIG. 1 is a sectional view of a launching apparatus for underwater payloads according to a first embodiment of the invention.

FIG. 1 shows a launching apparatus 1 for underwater payloads according to the present embodiment. The launching apparatus 1 for underwater payloads includes: a launch tube 3 in which an underwater payload 2 is loaded; a conduit 4 for applying water pressure for launching the underwater payload 2 to the launch tube 3; a pipe 5 which is a communicating portion bringing the launch tube 3 and the conduit 4 into communication with each other; a moving object 6 disposed in the conduit 4; a plurality of conduit coils; a plurality of return coils; a plurality of main circuits; a plurality of return circuits; a plurality of sensors; and a control device 101.

The conduit 4 extends axially, that is, extends in the axial direction, including a first end portion 4a and a second end portion 4b, which are axially opposite end portions. The pipe 5 is connected to a portion located behind the underwater payload 2 in the launch tube 3 and a communicating portion 4c that is an axial part of the conduit 4 and located in a position separate from the first end portion 4a. The communicating portion 4c is a portion that communicates with the launch tube 3 through the pipe 5, being located between the first end portion 4a and the second end portion 4b. In the present embodiment, the communicating portion 4c is located in a position closer to the second end portion 4b than the first end portion 4a. Each of the launch tube 3, the conduit 4, and the pipe 5 is filled with water, for example, seawater.

The first end portion 4a of the conduit 4 is provided with a water supply valve 30, which allows the water to be supplied to the conduit 4 from the first end portion 4a when the water supply valve 30 is opened.

The plurality of conduit coils, in the present embodiment, include five conduit coils, namely, a first conduit coil 11, a second conduit coil 12, a third conduit coil 13, a fourth conduit coil 14, and a fifth conduit coil 15. The first to fifth conduit coils 11 to 15 are disposed around the conduit 4 in a first region 4R1 between the first end portion 4a and the communicating portion 4c and aligned in the axial direction in the order of the first to fifth conduit coils 11, 12, 13, 14, and 15 from the first end portion 4a.

The plurality of return coils, in the present embodiment, include two return coils, namely, a first return coil 21 and a second return coil 22. The first and second return coils 21 and 22 are disposed around the conduit 4 in a second region 4R2 between the communicating portion 4c and the second end portion 4b and aligned in the order of the first and second return coils 21 and 22 from the communicating portion 4c. The first region 4R1 according to the present embodiment has an axial dimension larger than the axial dimension of the second region 4R2.

Each of the first to fifth conduit coils 11, 12, 13, 14, and 15 and the first and second return coils 21 and 22 is wound circumferentially of the conduit 4. Each of the first to fifth conduit coils 11, 12, 13, 14, and 15 and the first and second return coils 21 and 22 may be a superconductive coil.

The plurality of main circuits include a first main circuit 41 connected to the first conduit coil 11, a second main circuit 42 connected to the second conduit coil 12, a third main circuit 43 connected to the third conduit coil 13, a fourth main circuit 44 connected to the fourth conduit coil 14, and a fifth main circuit 45 connected to the fifth conduit coil 15.

The plurality of return circuits include a first return circuit 51 connected to the first return coil 21 and a second return circuit 52 connected to the second return coil 22.

The first to fifth main circuits 41 to 45 and the first and second return circuits 51 and 52 include respective capacitors and respective switches. The capacitors are charged in advance. Each of the circuits 41 to 45, 51, and 52 passes an electric current through a coil connected to the circuit, that is, allows the electric current to flow in the coil connected to the circuit, the coil being one of the plurality of coils 11 to 15, 21, and 22, when the switch included in the circuit is switched to ON. The control device 101 controls the operation of each of the first to fifth main circuits 41 to 45 and the first and second return circuits 51 and 52.

The plurality of sensors are disposed in respective positions closer to the second end portion 4b than the first to fifth conduit coils 11 to 15 and the return coils 21 and 22, respectively, and adjacent to the respective coils. Specifically, in FIG. 1, the plurality of sensors include a first main sensor 111 adjacent to the first conduit coil 11 on the left side thereof (i.e., the side closer to the second end portion 4b), a second main sensor 112 adjacent to the second conduit coil 12 on the left side thereof, a third main sensor 113 adjacent to the third conduit coil 13 on the left side thereof, a fourth main sensor 114 adjacent to the fourth conduit coil 14 on the left side thereof, a fifth main sensor 115 adjacent to the fifth conduit coil 15 on the left side thereof, a first return sensor 121 adjacent to the first return coil 21 on the right side thereof (i.e., the side closer to the communicating portion 4c), and a second return sensor 122 adjacent to the second return coil 22 on the right side thereof.

Each of the first to fifth main sensors 111 to 115 and the first and second return sensors 121 and 122 detects the moving object 6 in the conduit 4. At least a part of the sensors 111 to 115, 121, and 122 may be disposed in the conduit 4, that is, underwater. As the sensors, for example, ultrasonic sensors can be used.

The moving object 6 includes a piston 61 formed of a nonconductive material and an induction coil 62 mounted on the piston 61 so as to make integral movement with the piston 61. The induction coil 62 is wound circumferentially of the piston 61 around the piston 61.

The launching apparatus 1 for underwater payloads further includes a fixing mechanism 70. The fixing mechanism 70 is switchable between a fixing state of fixing the moving object 6 at an initial position, a position close to the first end portion 4a in the conduit 4 according to the present embodiment, to hinder the moving object 6 from movement and a releasing state of releasing the moving object 6 to allow the moving object 6 to make an axial movement.

Figure 2:
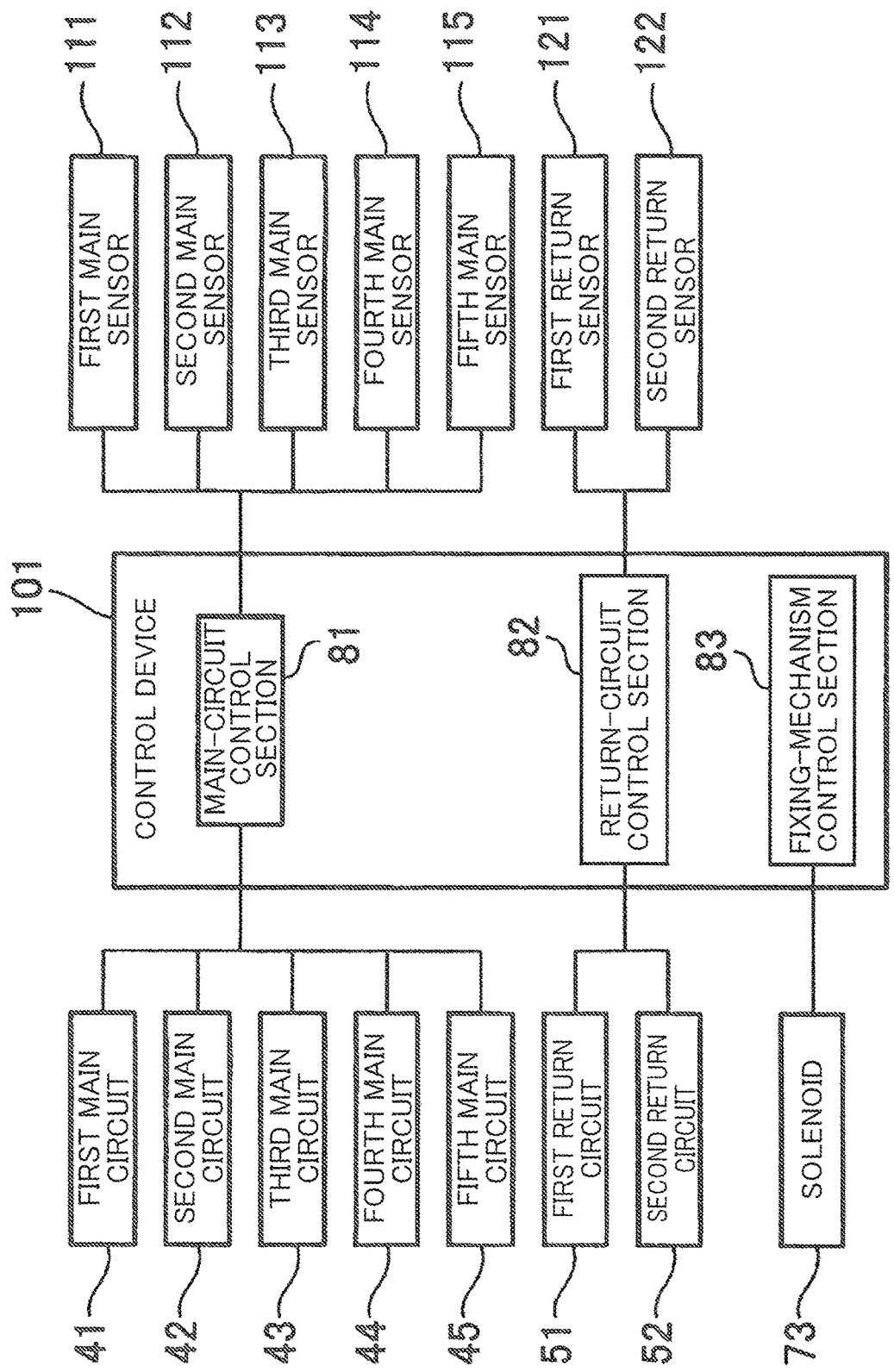
FIG. 2 is a block diagram showing functions of a control device of the launching apparatus for underwater payloads.

The fixing mechanism 70 according to the present embodiment includes a pair of protrusions 71 and 72 and a solenoid 73 shown in FIG. 2. Each of the protrusions 71 and 72 is switched between a locking position where each of the protrusions 71 and 72 projects inward beyond the inner side surface of the conduit 4 to lock the moving object 6 and a releasing position where each of the protrusions 71 and 72 retracts radially outward of the conduit 4 from the locking position to release the moving object 6. The solenoid 73 includes a distal end connected to the pair of protrusions 71 and 72, the distal end making an action to move the pair of protrusions 71 and 72 between the locking position and the releasing position. The control device 101 controls the operation of the solenoid 73 as explained below.

The protrusions 71 and 72 hold the moving object 6 between the protrusions 71 and 72, when switched to the locking positions, to thereby fix the moving object 6 at the initial position (in the present embodiment, the position between the first conduit coil 11 and the second conduit coil 12). The protrusions 71 and 72, when located at the locking position, restrain the moving object 6 from being flowed toward the second end portion 4b by the pressure of the water when the water supply valve 30 is opened to supply the water to the conduit 4. The protrusions 71 and 72 of the fixing mechanism 70 according to the present embodiment are arranged so as to hold the moving object 6 at such a position that a part of the moving object 6 is located on the inner side of the first conduit coil 11.

The control device 101 includes, as shown in FIG. 2, a main-circuit control section 81, a return-circuit control section 82, and a fixing-mechanism control section 83.

The main-circuit control section 81 is electrically connected to each of the first to fifth main circuits 41 to 45 and each of the first to fifth main sensors 111 to 115.

The main-circuit control section 81 performs receiving a detection signal output from each of the first to fifth main sensors 111 to 115 when the sensor detects the moving object 6, acquiring information on the position of the moving object 6 from the detection signal, and controlling, on the basis of the information, change of the switch of each of the first to fifth main circuits 41 to 45 between ON and OFF, that is, controlling selection between flowing and not flowing an electric current to each of the first to fifth conduit coils 11 to 15.

The main-circuit control section 81 can also control the direction of electric current flowing in the first main circuit 41, the second main circuit 42, the third main circuit 43, the fourth main circuit 44, and the fifth main circuit 45. For example, the main-circuit control section 81 is capable of both of making an electric current flow in the first main circuit 41 in such a first direction that the first conduit coil 11 generates a magnetic field in a direction toward the first end portion 4a in the conduit 4 and making an electric current flow in the first main circuit 41 in such a second direction opposite to the first direction that the first conduit coil 11 generates a magnetic field in a direction toward the second end portion 4b opposite to the direction of the above magnetic field toward the first end portion 4a.

For example, when the second main sensor 112 shown in FIG. 1 detects the moving object 6 and inputs a detection signal to the main-circuit control section 81, the main-circuit control section 81 performs a control to make the switch of the first main circuit 41 be OFF and making the switch of the second main circuit 42 be ON.

The main-circuit control section 81, alternatively, may perform a control to temporarily make the switches included in the first to fifth main circuits 41 to 45 be ON in the order of the first main circuit 41, the second main circuit 42, the third main circuit 43, the fourth main circuit 44, and the fifth main circuit 45 at respective timings stored in advance.

As shown in FIG. 2, the return-circuit control section 82 is electrically connected to the first and second return circuits 51 and 52 and the first and second return sensors 121 and 122. The return-circuit control section 82 performs receiving a detection signal output from each of the first to second return sensors 121 and 122 when the sensor detects the moving object 6, acquiring information concerning the position of the moving object 6 from the detection signal, and controlling, on the basis of the information, the change of the switch of each of the first return circuit 51 and the second return circuit 52 between ON and OFF, that is, controlling the selection between flowing and not flowing an electric current in each of the first and second return coils 21 and 22.

The return-circuit control section 82 can also control the direction of electric current flowing in the first and second return circuits 51 and 52. For example, the return-circuit control section 82 is capable of both of making an electric current flow in the first return circuit 51 in such a first direction that the first return coil 21 generates a magnetic field in the direction toward the second end portion 4b in the conduit 4 and making an electric current flow in the first return circuit 51 in such a second direction opposite to the first direction that the first return coil 21 generates a magnetic field in the direction toward the first end portion 4a opposite to the direction of the above magnetic field toward the second end portion 4b.

Figure 5:
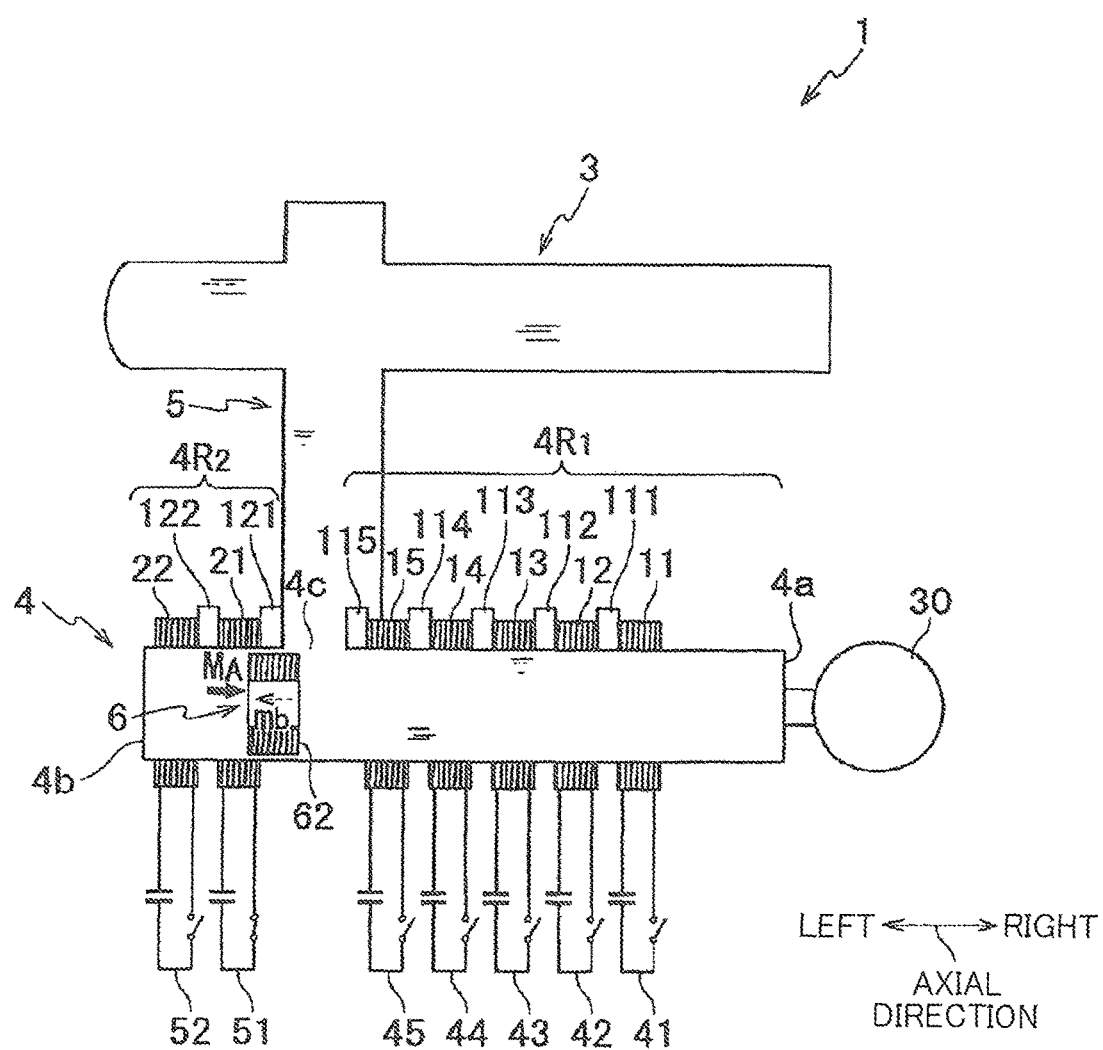
FIG. 5 is a sectional view showing the operation of a moving object after the underwater payload according to the first embodiment has been launched.

For example, when the second return sensor 122 detects the moving object 6 and inputs a detection signal to the return-circuit control section 82, the return-circuit control section 82 performs a control to make the switch of the first return circuit 51 be ON (see FIG. 5).

The return-circuit control section 82, alternatively, may perform a control to temporarily make the switches included in the first and second return circuits 51 and 52 be ON in the order of the first return circuit 51 and the second return circuit 52 at respective timings stored in advance.

As shown in FIG. 2, the fixing-mechanism control section 83 is electrically connected to the solenoid 73 of the fixing mechanism 70 to control the operation of the solenoid 73. For example, when an operator operates an operation button, before the water supply valve 30 is opened, to cause a fixing command signal to be sent from the operation button to the fixing-mechanism control section 83, the fixing-mechanism control section 83 actuates the solenoid 73 to project the protrusions 71 and 72 to the locking position. When an operator operates the operation button, for launch of the underwater payload 2, to cause a releasing command signal to be sent from the operation button to the fixing-mechanism control section 83, the fixing-mechanism control section 83 actuates the solenoid 73 to retract the protrusions 71 and 72 to a retracted position.

The main-circuit control section 81, the return-circuit control section 82, and the fixing-mechanism control section 83 may be configured as a single control section. Alternatively, it is possible to configure the main-circuit control section 81 and the return-circuit control section 82 of the control sections 81 to 83 as a single control section.

Next will be explained a process in which the launching apparatus 1 for underwater payloads launches the underwater payload 2, with reference to FIGS. 1, 3, 4, and 5.

Figure 3:
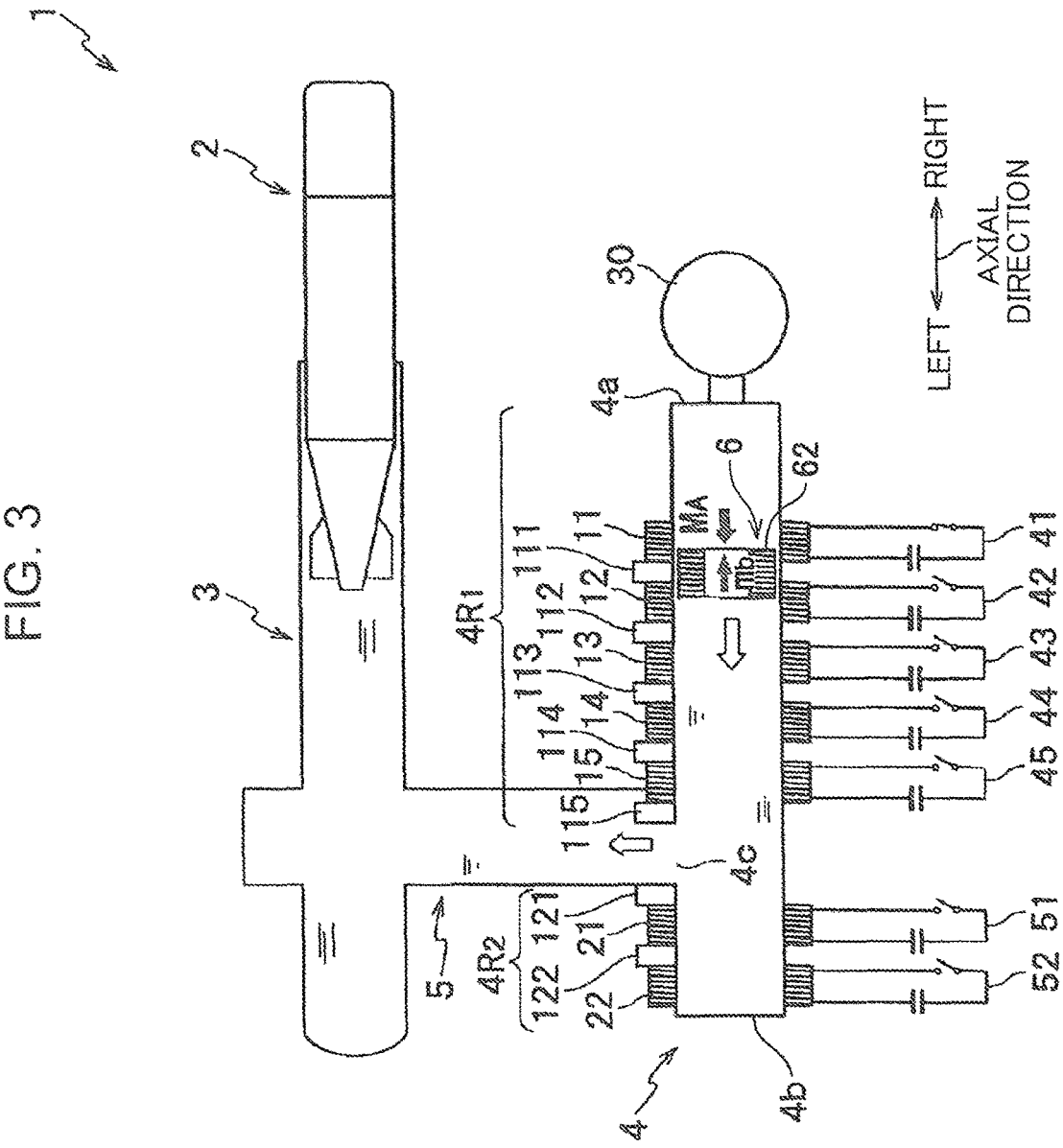
FIG. 3 is a sectional view showing a process for launching an underwater payload according to the first embodiment.

FIG. 1 shows an initial state before the launch. In the initial state, the moving object 6 is fixed in the initial position, i.e., in the present embodiment, the position in the conduit 4 and between the first and second conduit coils 11 and 12. In the initial state, upon the application of the operation to the operation button, the fixing-mechanism control section 83 of the control device 101 operates the solenoid 73 to retract the protrusions 71 and 72 radially outward from the locking position shown in FIG. 1 to the retracted position to thereby release the fixing of the moving object 6. Subsequently, the main-circuit control section 81 of the control device 101 makes the switch of the first main circuit 41 be ON to thereby pass an electric current through the first conduit coil 11, that is, to thereby allow the electric current to flow in the first conduit coil 11. The electric current generates an axial magnetic field, that is, a first magnetic field MA, as shown in FIG. 3, in the direction toward the second end portion 4b of the conduit 4, i.e., leftward in FIG. 1.

The first magnetic field MA generates an electric current flowing in the induction coil 62 of the moving object 6 in the conduit 4. The electric current generates a magnetic field in a direction opposite to the direction of the first magnetic field MA, that is, a second magnetic field mb toward the first end portion 4a of the conduit 4, rightward in FIG. 3, on the inner side of the induction coil 62. The second magnetic field mb and the first magnetic field MA makes an interaction therebetween, which causes the entire moving object 6 including the induction coil 62 to axially repulse the first conduit coil 11 forming the first magnetic field MA. The repulsion brings the moving object 6 into movement in an advance direction, which is a direction toward the communicating portion 4c from the first end portion 4a, leftward in FIG. 1. The movement causes, as shown in FIG. 3, the moving object 6 to press the water on the front side (in FIG. 1, the left side) thereof in the advance direction, toward the second end portion 4b, to thereby increase the water pressure in the conduit 4 and the water pressure in the launch tube 3 communicating with the conduit 4 through the pipe 5. Causing the second magnetic field mb in the direction opposite to the direction of the first magnetic field MA in the moving object 6 be achieved by, for example, determining the winding direction of the induction coil 62 of the moving object 6 to a direction opposite to the winding direction of the first conduit coil 11.

When the moving object 6 moves in the advance direction and the second main sensor 112 detects the moving object 6, the main-circuit control section 81 of the control device 101 makes the switch of the first main circuit 41 be OFF to stop the electric current flowing in the first conduit coil 11 and makes the switch of the second main circuit 42 be ON to thereby pass an electric current through the second conduit coil 12 adjacent to the first conduit coil 11 on the downstream side thereof in the advance direction. This causes the second conduit coil 12, instead of the first conduit coil 11, to generate the first magnetic field MA axially toward the second end portion 4b (in FIG. 3, the right direction).

The first magnetic field MA which the second conduit coil 12 forms generates an electric current in the induction coil 62 of the moving object 6. The electric current generates the second magnetic field mb in a direction opposite to the direction of the first magnetic field MA (rightward in FIG. 3) on the inner side of the induction coil 62 of the moving object 6. By the interaction between the second magnetic field mb and the first magnetic field MA, the moving object 6 axially repulse the second conduit coil 12 forming the first magnetic field MA, thereby moving in the advance direction, leftward in FIG. 3, toward the second end portion 4b of the conduit 4.

Figure 4:
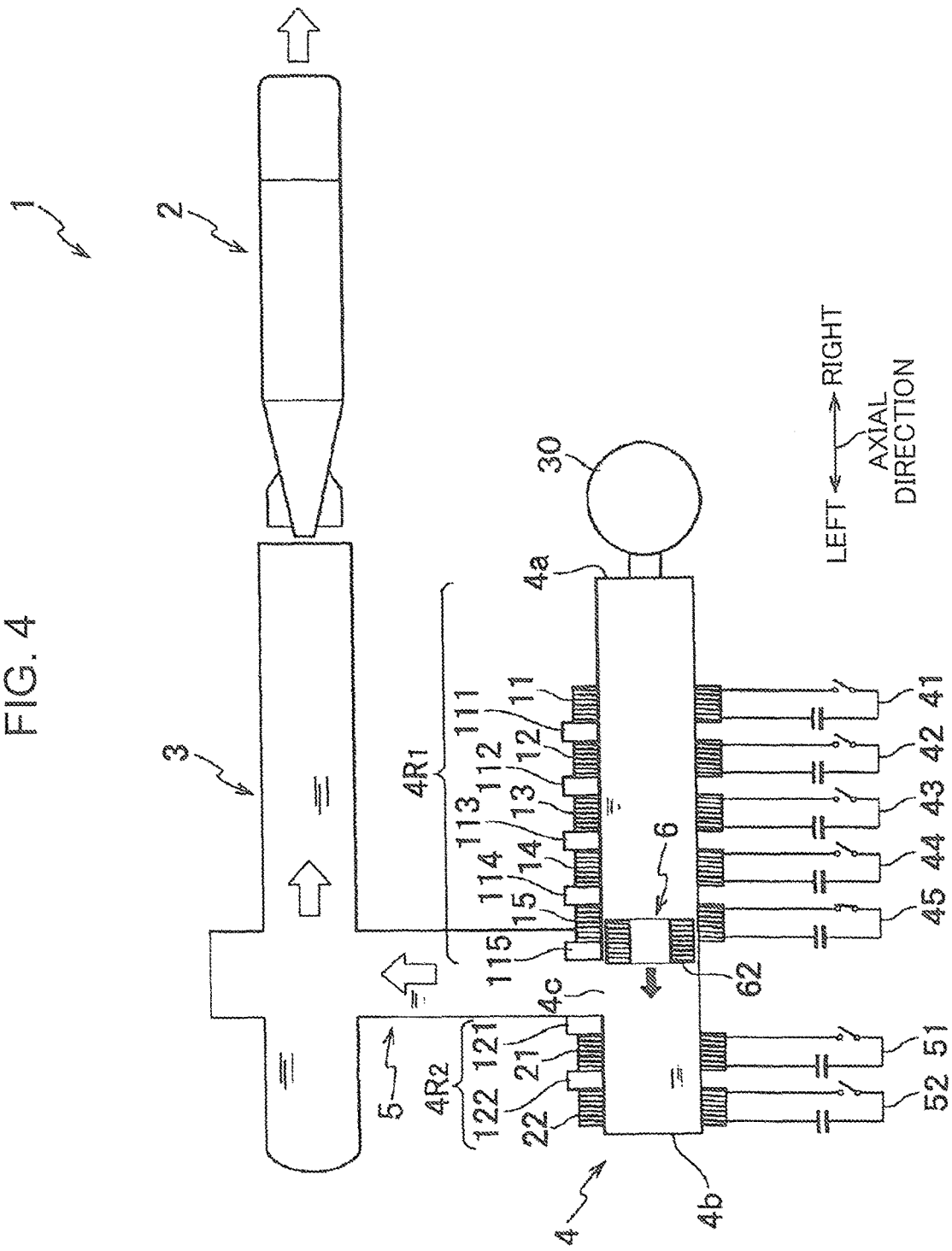
FIG. 4 is a sectional view showing the process for launching the underwater payload according to the first embodiment.

The above-described process is performed by the third main sensor 113, the third main circuit 43, the third conduit coil 13, the fourth main sensor 114, the fourth main circuit 44, the fourth conduit coil 14, the fifth main sensor 114, the fifth main circuit 45 and the fifth conduit coil 15, in this order, which advances the moving object 6 toward the second end portion 4b. At a point in time when a predetermined time has been passed after the fifth sensors 115 detects the moving object 6 as shown in FIG. 4, the main-circuit control section 81 of the control device 101 makes the switch of the fifth main circuit 45 be OFF.

Thus, every time a part of the moving object 6 has passed through a position on the inner side of each of the conduit coils by a predetermined distance, the conduit coil generates the first magnetic field MA to cause in the moving object 6 the second magnetic field mb in a direction opposite to the direction of the first magnetic field MA (that is, leftward in FIG. 1 etc.). The interaction between the second magnetic field mb and the first magnetic field MA moves the moving object 6 in the advance direction (leftward in FIG. 1 etc.) to thereby increase the pressure of the water on the front side (leftward in FIG. 1 etc.) of the moving object 6 in the advance direction, and further increase the water pressure in the launch tube 3. Thus increased water pressure causes the underwater payload 2 to be launched from the launch tube 3.

The moving object 6 accelerated in the first region 4R1 passes through the communicating portion 4c of the conduit 4 to enter the second region 4R2, as shown in FIG. 5. When the first return sensor 121 detects the moving object 6, the return-circuit control section 82 of the control device 101 makes the switch of the first return circuit 51 from OFF to ON to thereby pass an electric current through the first return coil 21. The electric current generates the third magnetic field MA axially toward the first end portion 4a (rightward in FIG. 5).

The third magnetic field MA generates an electric current flowing in the induction coil 62 of the moving object 6. The electric current generates a fourth magnetic field mb in a direction opposite to the direction of the third magnetic field MA, that is, the advance direction toward the second end portion 4b (leftward in FIG. 5) on the inner side of the induction coil 62. The fourth magnetic field mb and the third magnetic field MA makes an interaction, which causes the induction coil 62 forming the fourth magnetic field mb and the first return coil 21 forming the third magnetic field MA to repulse each other. Thus generated repulsive force acts on the moving object 6 advancing toward the second end portion 4b by inertia, as a braking force, that is, a force in a retraction direction toward the first end portion 4a of the conduit 4, thereby decelerating the moving object 6 (rightward force in FIG. 6). This restrains the moving object 6 from movement in the advance direction toward the second end portion 4b (leftward in FIG. 5). Furthermore, the water in the second region 4R2 functions as a cushioning material to thereby further restrain the moving object 6 from the movement in the advance direction.

In the case where the moving object 6 further moves in the advance direction (leftward in FIG. 5) toward the second end portion 4b of the conduit 4 against the above braking force, the second return sensor 122 located downstream of the first return sensor 121 in the advance direction detects the moving object 6, and the return-circuit control section 82, which receives the signal of the detection, makes the switch of the first return circuit 51 be OFF to stop the electric current flowing in the first return coil 21 and makes the switch of the second return circuit 52 be ON to pass an electric current through the second return coil 22. This causes the second return coil 22 to generate the third magnetic field MA in the retraction direction, rightward in FIG. 5. The third magnetic field MA generates an electric current flowing in the induction coil 62 of the moving object 6. The electric current generates the fourth magnetic field mb in a direction opposite to the direction of the third magnetic field MA (the advance direction toward the second end portion 4b; leftward in FIG. 6) on the inner side of the induction coil 62. The interaction between the fourth magnetic field mb and the third magnetic field MA causes the induction coil 62 forming the fourth magnetic field mb and the second return coil 22 forming the third magnetic field MA to repulse each other. Thus generated repulsive force acts on the moving object 6, as a further braking force in the retraction direction toward the first end portion 4a (in FIG. 5, the right direction). The braking force further ensures the restraint of the moving object 6 from collision with the second end portion 4b of the conduit 4.

Next will be explained a process for returning the moving object 6 to the initial position after the launch of the underwater payload 2, with reference to FIGS. 6 and 7.

Figure 6:
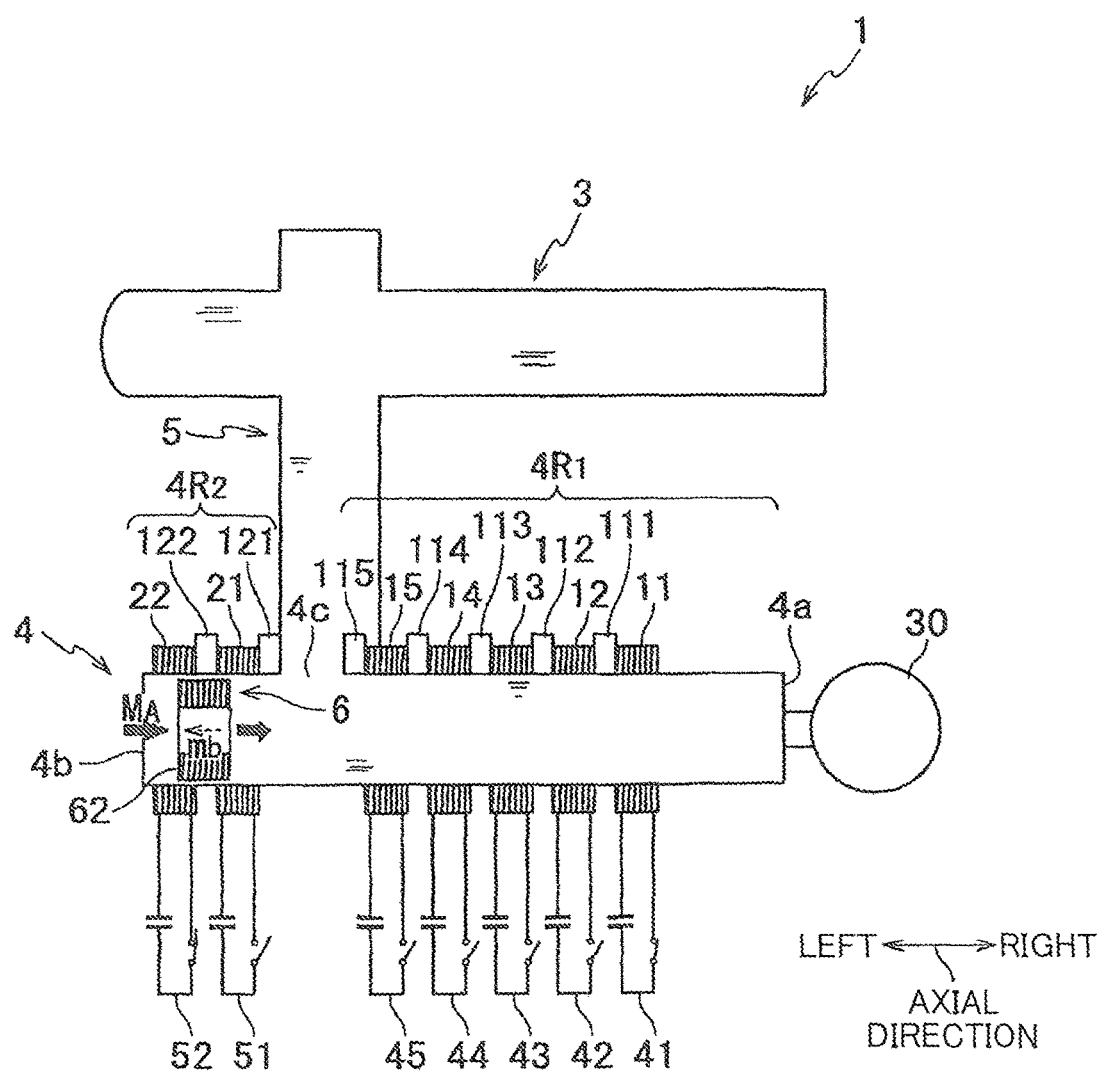
FIG. 6 is a sectional view showing a process for returning the moving object to an initial position after the underwater payload according to the first embodiment has been launched.
Figure 7:
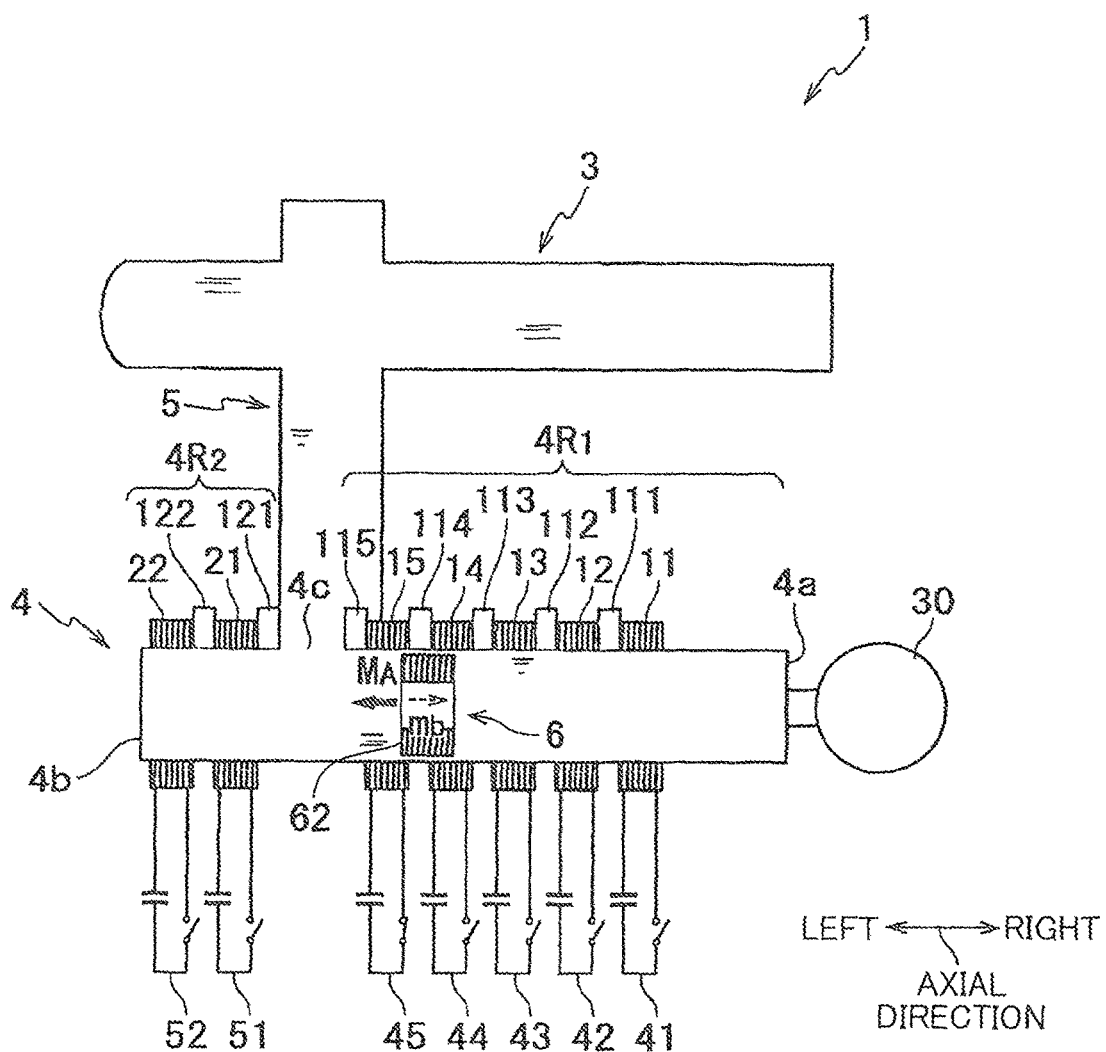
FIG. 7 is a sectional view showing the process for returning the moving object to the initial position after the underwater payload according to the first embodiment has been launched.

When a part of the moving object 6 has passed through a position on the inner side of the second return coil 22 as shown in FIG. 6, the return-circuit control section 82 makes the switch of the second return circuit 52 be ON to pass an electric current through the second return coil 22. The electric current, which is one in the direction same as the direction of the electric current generated in order to decelerate the moving object 6 as explained above, generates a fifth magnetic field MA axially toward the first end portion 4a (rightward in FIG. 6). The return-circuit control section 82 may perform a control of making the switch of the first return circuit 51 be ON on the basis of operation applied to an operation button by the operator, other than the control of making the switch of the first return circuit 51 be ON on the basis of the detection of the moving object 6 by the second return sensor 122.

The fifth magnetic field MA generated by the first return coil 21 generates an electric current flowing in the induction coil 62 of the moving object 6. The electric current generates a sixth magnetic field mb in a direction opposite to the direction of the fifth magnetic field MA, that is, the advance direction (leftward in FIG. 6) on the inner side of the induction coil 62. The sixth magnetic field mb and the fifth magnetic field MA makes an interaction therebetween, which causes the moving object 6 forming the sixth magnetic field mb to repulse the first return coil 22 forming the fifth magnetic field MA to thereby move the moving object 6 in the retraction direction (rightward in FIG. 6), which is an axial direction toward the first end portion 4a of the conduit 4.

When the moving object 6 thus accelerated in the second region 4R2 goes into the first region 4R1 and the fifth main body sensor 115 detects the moving object 6, the main-circuit control section 81 makes the switch of the fifth main circuit 45 be ON to pass an electric current through the fifth conduit coil 15, thereby causing the fifth magnetic field MA in the retraction direction to be generated. The fifth magnetic field MA generates an electric current flowing in the induction coil 62 of the moving object 6 to thereby generate the sixth magnetic field mb in a direction opposite to the direction of the fifth magnetic field MA, that is, the advance direction toward the second end portion 4b (leftward in FIG. 7) on the inner side of the induction coil 62 of the moving object 6. The interaction between the sixth magnetic field mb and the fifth magnetic field MA causes the moving object 6 to repulse the fifth conduit coil 15 forming the fifth magnetic field MA, thereby moving the moving object 6 in the retraction direction toward the first end portion 4a (rightward in FIG. 7).

Subsequently, when the third main sensor 113 detects the moving object 6, the main-circuit control section 81 makes the switch of the fifth main circuit 45 be OFF to stop the electric current flowing in the fifth conduit coil 15 and makes the switch of the fourth main circuit 44 be ON to pass an electric current through the fourth conduit coil 14 adjacent to the fifth conduit coil 15 downstream thereof in the retraction direction. The electric current generates the fifth magnetic field MA in the retraction direction in the conduit 4. The fifth magnetic field MA generates an electric current flowing in the induction coil 62 of the moving object 6. The electric current generates the sixth magnetic field mb in a direction opposite to the direction of the fifth magnetic field MA, that is, the advance direction toward the second end portion 4b (leftward in FIG. 7) on the inner side of the induction coil 62. The interaction between the sixth magnetic field mb and the fifth magnetic field MA causes the moving object 6 to repulse the fourth conduit coil 14 forming the fifth magnetic field MA, thereby moving the moving object 6 in the retraction direction toward the first end portion 4a (rightward in FIG. 7).

The above-described process is performed by each of the second main sensor 112, the third main circuit 43, the third conduit coil 13, the first main sensor 111, the second main circuit 42, the second conduit coil 12, in this order, which moves the moving object 6 in the retraction direction, finally returning it to the initial position. The main-circuit control section 81 is able to stop the moving object 6 in the initial position by, for example, making the switch of the first main circuit 41 be ON to cause the first conduit coil 11 and the moving object 6 to repulse each other, when the first main sensor 111 detects the moving object 6, and returning the switch of the first main circuit 41 to OFF at a point in time when a predetermined time has been passed thereafter.

As explained above, the launching apparatus 1 for underwater payloads in the present embodiment achieves the following effects.

In a state where the moving object 6 is located in the initial position, the main-circuit control section 81 of the launching apparatus 1 for underwater payloads passes an electric current through the first conduit coil 11 to generate the first magnetic field MA in the direction toward the second end portion 4b (leftward in FIG. 1) in the axial direction in the conduit 4. The first magnetic field MA generates an electric current flowing in the induction coil 62 of the moving object 6 to generate the second magnetic field mb in the direction toward the first end portion 4a (rightward in FIG. 1). The interaction between the second magnetic field mb and the first magnetic field MA causes the moving object 6 to repulse the first conduit coil 11 forming the first magnetic field MA, thereby moving the moving object 6 in the advance direction toward the second end portion 4b (leftward in FIG. 1). By performing such control on each of the second conduit coil 12, the third conduit coil 13, the fourth conduit coil 14, and the fifth conduit coil 15 in this order, the main-circuit control section 81 is able to cause the moving object 6 to be moved in the advance direction toward the second end portion 4b (leftward in FIG. 3). The moving object 6 thus moved in the advance direction presses the water forward of the moving object 6 to thereby increase the water pressure in the launch tube 3 communicating with the conduit 4 through the pipe 5 to launch the underwater payload 2 from the launch tube 3. In contrast with the conventional technique of passing an electric current through the water in the conduit for generating an electromagnetic force underwater, the launching apparatus 1 for underwater payloads, having no need for passing an electric current through the water (e.g., seawater) in the conduit 4, involves no possibility of influence by the electric resistance of the water or electrolysis of the water. This makes it possible to supply the water having pressure sufficient for launch of the underwater payload 2 to the launch tube 3 efficiently without applying a high voltage to each of the circuits.

Besides, the water filling the conduit 4 in the second region 4R2 between the communicating portion 4c and the other end portion 4b functions as a cushioning material, which can restrain the moving object 6 from collision with the second end portion 4b of the conduit 4 even if the moving object 6 accelerated in the first region 4R1 enters the second region 4R2.

Furthermore, the first return coil 21 and the second return coil 22 disposed in the second region 4R2 make it possible to more reliably avoid the collision. Specifically, when the return-circuit control section 82 makes the switch of the first return circuit 51 be ON to pass an electric current through the first return coil 21 to generate the third magnetic field MA in the direction toward the first end portion 4a (rightward in FIG. 5) in the conduit 4, the third magnetic field MA generates an electric current flowing in the induction coil 62 of the moving object 6 to generate the fourth magnetic field mb in a direction oppose to the direction of the third magnetic field MA. Hence, even if the moving object 6 is accelerated in the advance direction (leftward in FIG. 3) in the first region 4R1 to thereby enter the second region 4R2 by inertia, the repulsive force generated by the interaction between the third magnetic field MA and the fourth magnetic field mb, which force acts as a braking force in the retraction direction toward the first end portion 4a of the conduit 4 (rightward in FIG. 5) on the moving object 6, decelerates the moving object 6 to thereby ensure the restraint of the moving object 6 from collision with the other end portion 4b of the conduit 4. Different from a mechanical braking mechanism, the braking system thus based on electromagnetic force can suppress the movement of the moving object 6 without involving mechanical vibration or vibration due to collision. This makes it possible, for example, in the case of provided the launching apparatus 1 for underwater payloads to a submersible ship, to enable the submersible ship to be unlikely to be detected.

The launching apparatus 1 for underwater payloads, including the first to fifth main sensors 111 to 115 disposed near the first to fifth conduit coils 11 to 15, respectively, enables the main-circuit control section 81 to control the operation of the first to fifth main circuits 41 to 45 on the basis of information on the position of the moving object 6 provided by respective detection signals generated by the first to fifth main sensors 111 to 115. This makes it possible to perform on-off switching of an electric current flowing in the first to fifth conduit coils 11 to 15 at more appropriate timings, thus suppressing useless energization of the conduit coils to improve energy efficiency.

Moreover, the launching apparatus 1 for underwater payloads, including the first and second return sensors 121 and 122 disposed near the first and second return coils 21 and 22, respectively, enables the return-circuit control section 82 to control the first return circuit 51 and the second return circuit 52 so as to perform, at appropriate timings, on-off switching of an electric current flowing in each of the first return coil 21 and the second return coil 22, on the basis of the information on the position of the moving object 6 provided by the detection signals generated by the first and second return sensors 121 and 122. This makes it possible to suppress useless energization of the first and second return coils 21 and 22 to improve energy efficiency.

The return-circuit control section 82 is able to move the moving object 6 in the retraction direction toward the first end portion 4a (rightward in FIG. 6) by control of energization of the second return coil 22 and the first return coil 21 after the underwater payload 2 has been launched and the moving object 6 has been decelerated in the second region 4R2.

Furthermore, by passing an electric current through each of the fifth to first conduit coils 15 to 11 in this order from a point in time when the moving object 6 enters the first region 4R1 to generate the fifth magnetic field MA in the direction toward the second end portion 4a (leftward in FIG. 7) and generating the sixth magnetic field mb in a direction opposite to the direction of the fifth magnetic field MA by an electric current flowing to the induction coil 62 of the moving object 6, the main-circuit control section 81 can return the moving object 6 to the initial position by use of the interaction between the sixth magnetic field mb and the fifth magnetic field MA.

Besides, the launching apparatus 1 for underwater payloads, including the fixing mechanism 70, is able to fix the moving object 6 in an appropriate initial position, for example, a position between the first and second conduit coils 11 and 12, by switching the fixing mechanism 70 to the fixing state, that is, locating the protrusions 71 and 72 of the fixing mechanism 70 at the locking positions where the protrusions 71 and 72 project into the conduit 4 in the present embodiment. This makes it possible to effectively restrain the moving object 6 from being flowed in the advance direction toward the second end portion 4b by the supply of the water when the water supply valve 30 is opened to supply the water into the conduit 4 before the moving object 6 is driven.

In the launching apparatus 1 for underwater payloads according to the embodiment, the first magnetic field MA in the direction toward the second end portion 4b (leftward in FIG. 3) is generated by the energization of the first to fifth conduit coils 11 to 15 in the first region 4R1 of the conduit 4, and the third magnetic field MA in the direction opposite to the direction of the first magnetic field MA is generated by the energization of the first and second return coils 21 and 22, in the second region 4R2, for deceleration of the accelerated moving object 6. Thus opposing the direction of the magnetic field between the first region 4R1 and the second region 4R2 to each other can be realized by, for example, opposing the direction of the electric current flowed in each of the first to fifth conduit coils 11 to 15 and the direction of the electric current flowed in each of the first and second return coils 21 and 22 to each other, or by opposing the winding direction of the first return coil 21 and the second return coil 22 and the winding directions of the first to fifth conduit coils 11 to 15 to each other.

Although the embodiment of the present invention is explained above with reference to the drawings, it should be considered that a specific configuration of the present invention is not limited to the embodiment. The scope of the present invention is indicated by claims rather than by the above explanation. All changes within meanings and scopes equivalent to the claims are included in the scope of the present invention.

The present invention is not limited to a specific configuration of the moving object. While the moving object 6 according to the embodiment includes the piston 61 formed of the nonconductive material and the induction coil 62 mounted on the piston 61, a moving object 6A shown in FIGS. 8 to 10 as a second embodiment, the movement object 6A including a magnetic material 63 (e.g., including Fe or Ni or including a ferromagnetic material) instead of the induction coil 62, is also able to be driven by an electromagnetic force in the same manner as the moving object 6 according to the first embodiment. For example, when the first magnetic field MA in the advance direction toward the second end portion 4b (leftward in FIG. 1) is generated by the electric current flowing in the first conduit coil 11, the second magnetic field mb in the direction same as the direction of the first magnetic field MA is generated in the magnetic material included in the moving object. The second magnetic field mb and the first magnetic field MA, therefore, makes an interaction therebetween which causes the moving object including the magnetic material to be attracted to the first conduit coil 11. By use of thus generated attractive force, the moving object 6 can be driven to the advance direction toward the second end portion 4b.

The detail of driving the moving object 6A is explained below, with reference to FIG. 8 to FIG. 10.

Figure 8:
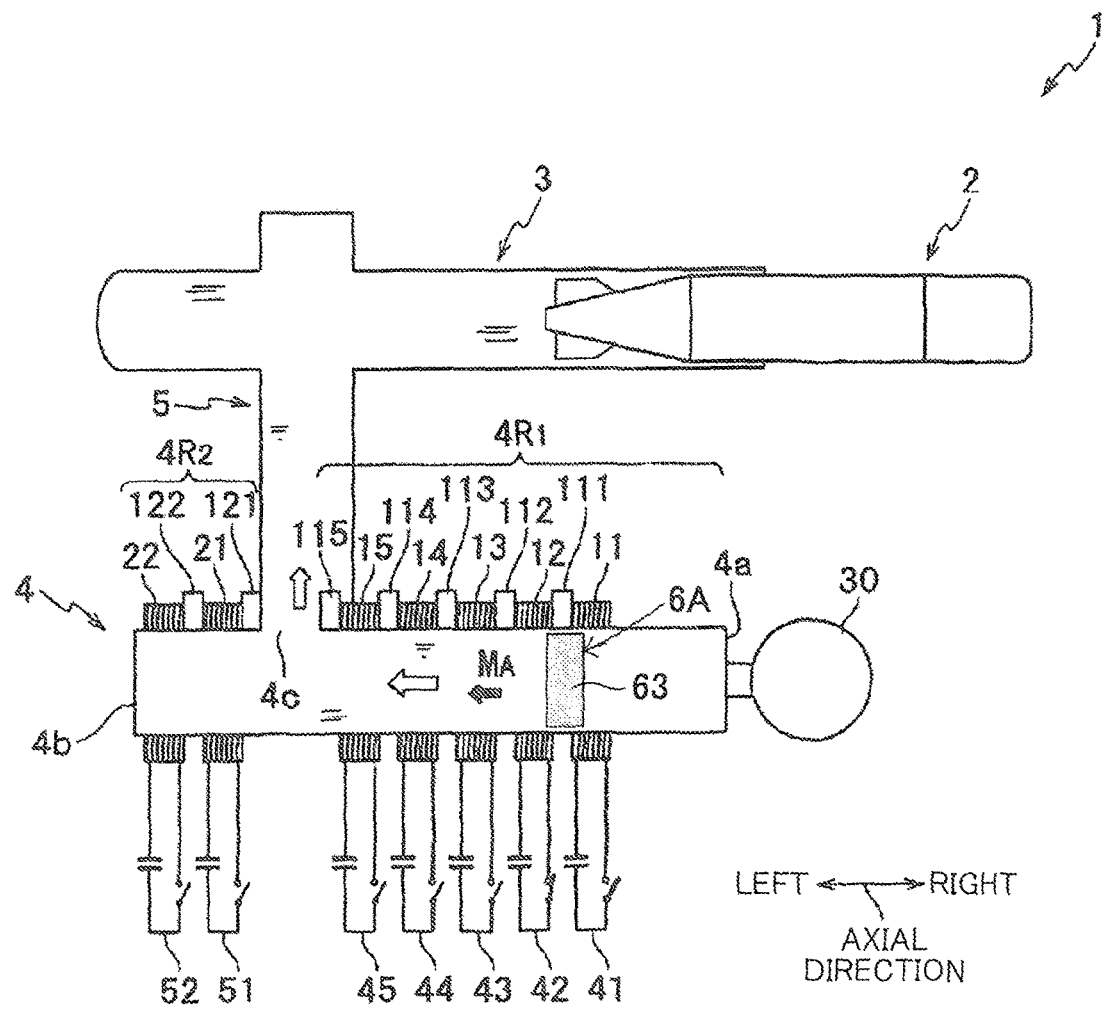
FIG. 8 is a sectional view showing a process for launching an underwater payload according to a second embodiment.
Figure 9:
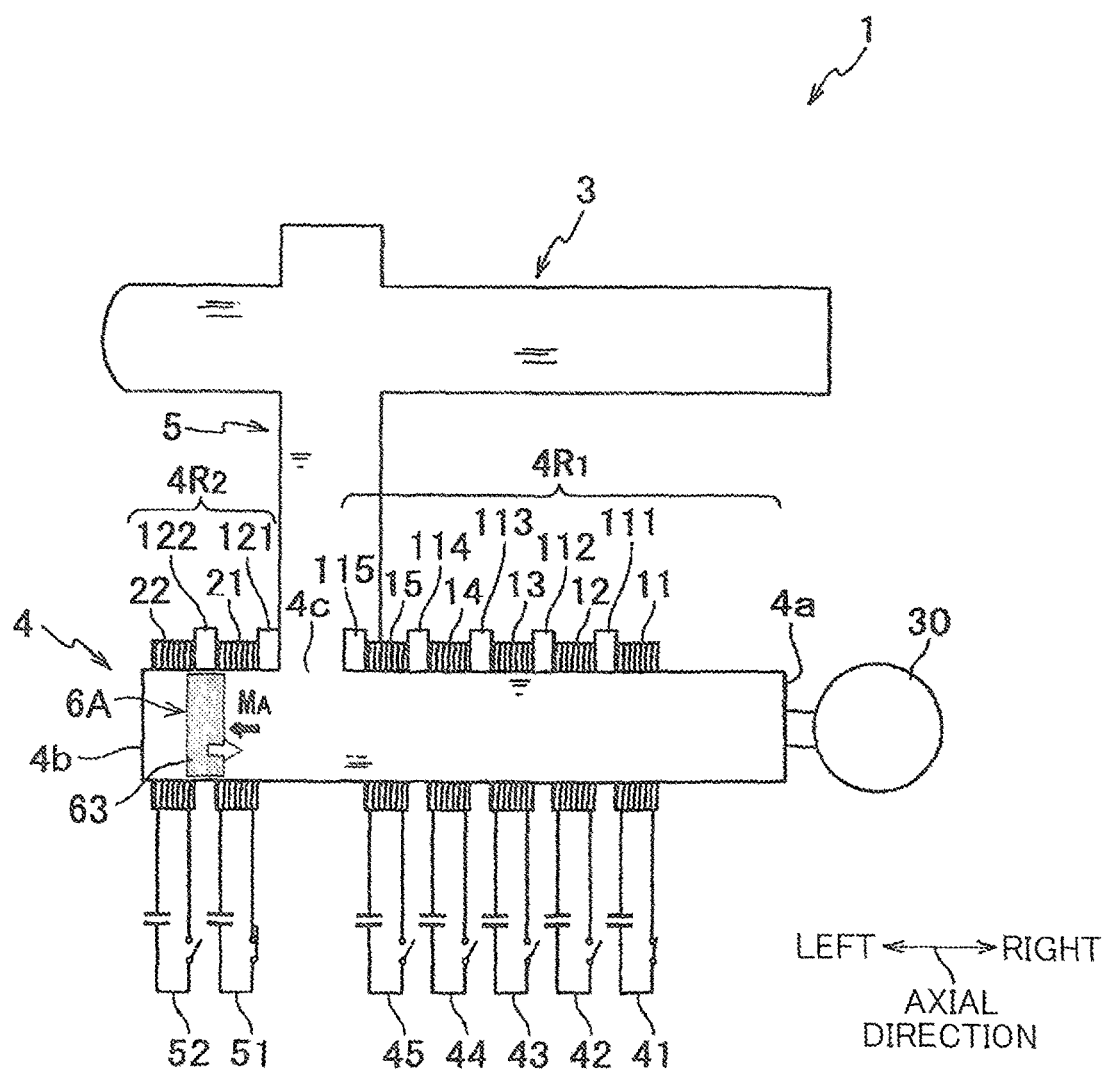
FIG. 9 is a sectional view showing a process for returning a moving object to an initial position after the underwater payload according to the second embodiment has been launched.

In a state where the moving object 6A is located at an initial position between the first and second conduit coils 11 and 12 as shown in FIG. 8, the main circuit control section 81 of the control device 101 according to the second embodiment makes the switch of the second main circuit 42 be ON to thereby pass an electric current through the second conduit coil 12. The electric current generates an axial magnetic field, that is, a first magnetic field MA, as shown in FIG. 8, in the direction toward the second end portion 4b of the conduit 4, i.e., leftward in FIG. 8. The first magnetic field MA generates a second magnetic field in the axial direction same as the direction of the first magnetic field MA in the magnetic material 63 of the moving object 6A. The second magnetic field mb and the first magnetic field MA makes an interaction therebetween, which causes the entire moving object 6A including the magnetic material 63 to be axially attracted by the second conduit coil 12 forming the first magnetic field MA. The moving object 6A is thus moved in an advance direction, which is a direction toward the communicating portion 4c from the first end portion 4a, leftward in FIG. 1, thereby increasing the water pressure in the conduit 4 and the water pressure in the launch tube 3 communicating with the conduit 4 through the pipe 5, similarly to the first embodiment.

When the moving object 6A moves in the advance direction and the second main sensor 112 detects the moving object 6A, the main-circuit control section 81 of the control device 101 makes the switch of the second main circuit 42 be OFF to stop the electric current flowing in the second conduit coil 12 and makes the switch of the third main circuit 43 be ON to thereby pass an electric current through the third conduit coil 13. This causes the third conduit coil 13 to generate, instead of the second conduit coil 12, the first magnetic field MA axially toward the second end portion 4b (in FIG. 9, leftward), thereby axially attracting the moving object 6A including the magnetic material 63, similarly to the second conduit coil 12.

The above-described process is performed by the third main sensor 113, the fourth main circuit 44, the fourth conduit coil 14, the fourth main sensor 114, the fifth main circuit 45 and the fifth conduit coil 15, in this order, which advances the moving object 6A toward the second end portion 4b. At a point in time when the fifth sensors 115 detects the moving object 6A as shown in FIG. 10, the main-circuit control section 81 of the control device 101 makes the switch of the fifth main circuit 45 be OFF. The advance of the moving object 6A increases the pressure of the water on the front side (leftward in FIG. 1 etc.) of the moving object 6A in the advance direction to thereby cause the underwater payload 2 to be launched from the launch tube 3 similarly to the first embodiment.

The moving object 6A accelerated in the first region 4R1 passes through the communicating portion 4c of the conduit 4 to enter the second region 4R2. When the second return sensor 122 detects the moving object 6A, the return-circuit control section 82 of the control device 101 makes the switch of the first return circuit 51 from OFF to ON, as shown in FIG. 9, to thereby pass an electric current through the first return coil 21. The electric current generates a third magnetic field MA axially toward the second end portion 4b (leftward in FIG. 9). The third magnetic field MA generates a fourth magnetic field mb in the direction same as the direction of the third magnetic field MA, that is, the advance direction toward the second end portion 4b (leftward in FIG. 9) in the magnetic material 63. The fourth magnetic field mb and the third magnetic field MA makes an interaction, which causes the first return coil 21 forming the third magnetic field MA to attract the moving object including the magnetic material 63. Thus generated attraction force acts on the moving object 6A advancing toward the second end portion 4b as a braking force, that is, a force in a retraction direction toward the first end portion 4a of the conduit 4 (rightward force in FIG. 9). The moving object 6A is thus restrained from movement in the advance direction toward the second end portion 4b (leftward in FIG. 9), similarly to the first embodiment.

The moving object 6A is returned back to the communication portion 4c side (rightward in FIG. 9) by the first magnetic field MA formed by the first return coil 21. On the basis of the detection of the moving object 6A by the first return sensor 121, the return-circuit control section 82 makes the switch of the first return circuit 51 be OFF. Furthermore, when the moving object 6A goes into the first region 4R1 and the fifth main body sensor 115 detects the moving object 6A, the main-circuit control section 81 makes the switch of the fifth main circuit 45 be ON to pass an electric current through the fifth conduit coil 15, thereby causing the fifth magnetic field MA in the retraction direction to be generated. The fifth magnetic field MA generates a sixth magnetic field in the direction same as the direction of the fifth magnetic field MA, that is, the retraction direction toward the first end portion 4a (rightward in FIG. 10) in the magnetic material 63 of the moving object 6A. The interaction between the sixth magnetic field and the fifth magnetic field MA causes the moving object 6A to be attracted by the fifth conduit coil 15 forming the fifth magnetic field MA, thereby moving the moving object 6 in the retraction direction toward the first end portion 4a (rightward in FIG. 10).

Figure 10:
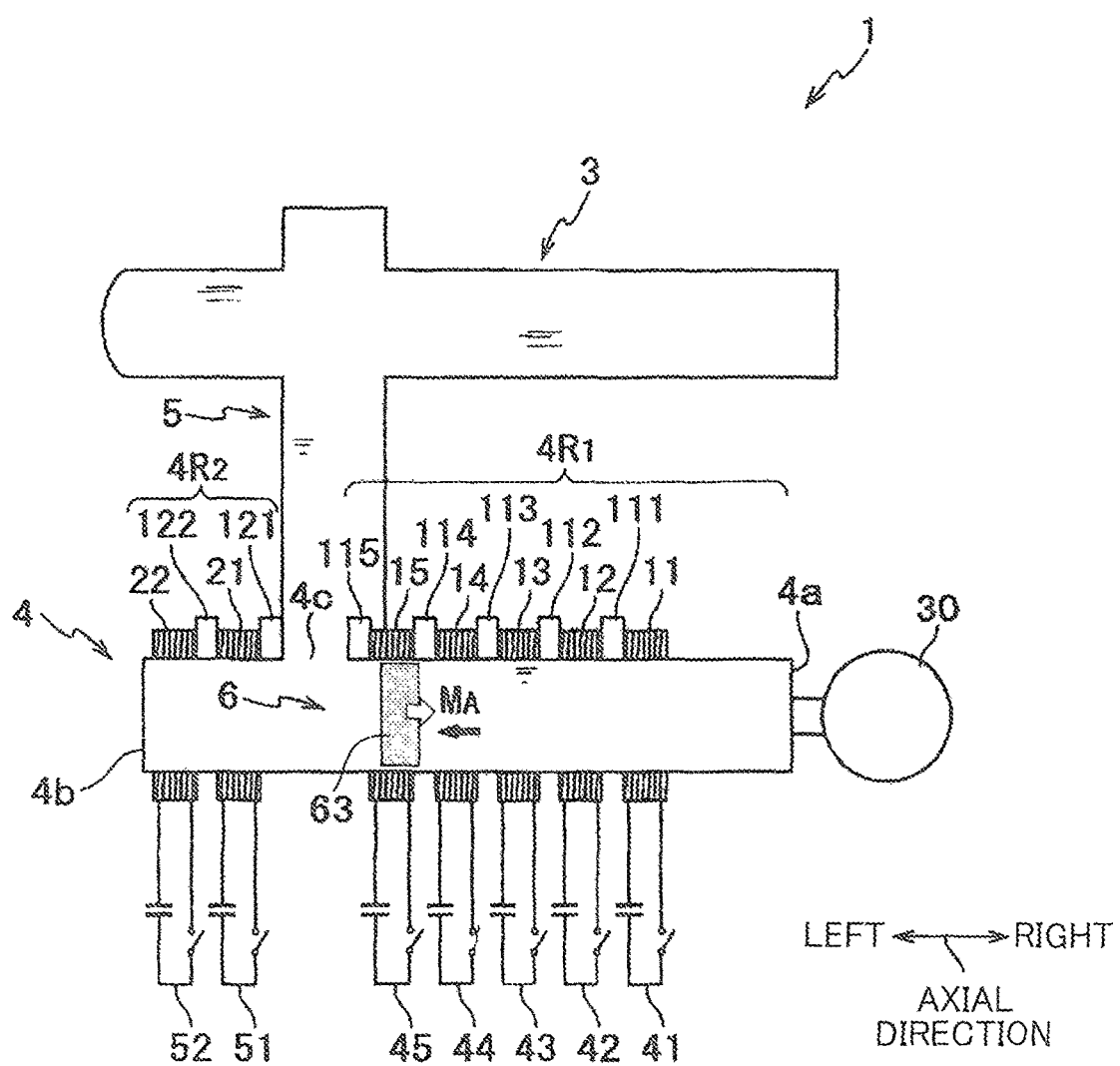
FIG. 10 is a sectional view showing a process for returning a moving object to an initial position after the underwater payload according to the second embodiment has been launched.

Subsequently, when the fourth main sensor 114 detects the moving object 6A as shown in FIG. 10, the main-circuit control section 81 makes the switch of the fifth main circuit 45 be OFF to stop the electric current flowing in the fifth conduit coil 15 and makes the switch of the fourth main circuit 44 be ON to pass an electric current through the fourth conduit coil 14 adjacent to the fifth conduit coil 15 downstream thereof in the retraction direction. The electric current generates the fifth magnetic field MA in the retraction direction in the conduit 4. The fifth magnetic field MA generates a sixth magnetic field in the direction same as the direction of the fifth magnetic field MA, that is, the retraction direction toward the first end portion 4a (leftward in FIG. 10) in the magnetic material 63 of the moving object 6A. The interaction between the sixth magnetic field and the fifth magnetic field MA causes the moving object 6A to be attracted by the fourth conduit coil 14 forming the fifth magnetic field MA, thereby moving the moving object 6A in the retraction direction toward the first end portion 4a (rightward in FIG. 10).

The above-described process is performed by each of the third main sensor 113, the third main circuit 43, the third conduit coil 13, the second main sensor 112, the second main circuit 42, the second conduit coil 12, in this order, which moves the moving object 6A in the retraction direction, finally returning it to the initial position. The main-circuit control section 81 is able to stop the moving object 6A in the initial position by, for example, making the switch of the first main circuit 41 be OFF when the first main sensor 111 detects the moving object 6A.

While the conduit 4 according to the above-described first and second embodiments includes the second region 4R2 between the communicating portion 4c and the other end portion 4b, the conduit according to the present invention does not have to include a second region. For example, the second end portion and the communicating portion may be located in substantially equal positions.

In the case where the launching apparatus for underwater payloads according to the present invention includes a sensor that detects the moving object, the position of the sensor is allowed to be freely set. Although the first to fifth main sensors 111 to 115 according to the embodiment are disposed in respective positions axially adjacent to the first to fifth conduit coils 11 to 15, the main sensors may be disposed, for example, on respective insides of the conduit coils. Similarly, respective positions of the first return sensor 121 and the second return sensor 122 are not limited to ones adjacent to the first return coil 21 and the second return coil 22, respectively.

Also the control of the operation of the main circuit performed by the main-circuit control section is not limited to the control according to the embodiment. For example, while the main-circuit control section 81 according to the embodiment makes the switch of the first main circuit 41 be OFF and thereafter makes the switch of the second main circuit 42 be ON upon receiving the detection signal generated by the first main sensor 111 which detects the moving object 6, it is also possible to perform control of automatically making the switch of the first main circuit 41 to OFF when a predetermined time elapses after making the switch be ON. Similarly, the return-circuit control section can perform various kinds of control.

In the case where the launching apparatus for underwater payloads according to the present invention includes a fixing mechanism, also the specific configuration of the fixing mechanism is not limited. While the fixing mechanism 70 according to the embodiment includes the pair of protrusions 71 and 72 capable of moving between the locking position and the releasing position and the solenoid 73 that actuates the protrusions 71 and 72, the fixing mechanism may include, when the moving object 6 includes a magnetic material, a magnet that applies a magnetic force to the magnetic material instead of the member that mechanically restrains the moving object like the protrusions 71 and 72. For example, the magnet can fix the moving object 6 in a predetermined position by magnetically attracting the moving object 6. The position where the moving object is fixed by the fixing mechanism is also not limited to one between the first and second conduit coils 11 and 12; the position may be another position.

As explained above, provided is an apparatus that launches an underwater payload with water pressure, the apparatus being capable of obtaining water pressure sufficient for the launch of the underwater payload efficiently without being affected by the electric resistance of water. The launching apparatus for underwater payloads includes: a launch tube in which an underwater payload is loaded; a conduit including a first end portion, which is one of axially opposite ends, and a communicating portion located in a position separate from the first end portion and communicating with the launch tube, the conduit being filled with water; a plurality of conduit coils disposed around the conduit in a first region between the communicating portion and the first end portion, the plurality of conduit coils aligned axially of the conduit; a plurality of main circuits configured to pass electric current through the conduit coils, respectively, so as to generate an axial magnetic field in the conduit; a main-circuit control section configured to control an operation of each of the plurality of main circuits; and a moving object disposed in the conduit and including a magnetic material or an induction coil, the moving object configured to move in the conduit in an advance direction from the first end portion toward the communicating portion to thereby generate, in the launch tube, water pressure for launching the underwater payload. The main-circuit control section controls the operation of each of the plurality of main circuits such that the main circuits pass electric currents through the conduit coils corresponding to the main circuits, respectively, to generate the axial first magnetic field and to thereby cause an axial second magnetic field in the moving object, the first magnetic field and the second magnetic field making an interaction which moves the moving object in the advance direction.

The apparatus, which generates an electromagnetic force for moving the moving object in the advance direction in the conduit by passing an electric current through the conduit coils disposed around the conduit in the first region and forming the second magnetic field in the induction coil of the magnetic material or the magnetic material with the first magnetic field formed by the electric current, is able to efficiently obtain water pressure for launching the underwater payload without being affected by the electric resistance of water in the conduit, differently from the conventional technique of passing an electric current through the water in the conduit.

It is preferable that the conduit includes a second region extending axially between the communicating portion and a second end portion, which is an axial end portion of the conduit opposite to the first end portion, and the second region is filled with water. The water in the second region functions as a cushioning material, thereby effectively restraining the moving object from collision with the second end portion.

More preferably, the launching apparatus for underwater payloads further includes: a return coil disposed in the second region; a return circuit configured to pass an electric current through the return coil so as to generate an axial third magnetic field in the conduit; and a return-circuit control section configured to control operation of the return circuit, wherein the return-circuit control section controls the operation of the return circuit such that the return circuit passes an electric current through the return coil to generate the third magnetic field to thereby cause an axial fourth magnetic field in the moving object, the third magnetic field and the fourth magnetic field making an interaction therebetween which decelerates the moving object. The return-circuit control section can ensure the restraint of the moving object from the collision with the second end portion by controlling the operation of the return circuit so as to decelerate the moving object in the second region.

It is preferable that the launching apparatus for underwater payloads further includes a plurality of sensors disposed in respective positions corresponding to the plurality of conduit coils so as to be capable of detecting the moving object, and the main-circuit control section controls the operation of the main circuits on the basis of information on the position of the moving object acquired from the plurality of sensors. The control makes it possible to suppress useless energization of the plurality of conduit coils to improve energy efficiency.

More preferably, the main-circuit control section controls the operation of the plurality of main circuits such that the plurality of main circuits pass electric currents through the conduit coils corresponding to the main circuits, respectively, to thereby generate an axial fifth magnetic field and to cause an axial sixth magnetic field in the moving object, the fifth magnetic field and the sixth magnetic field making an interaction therebetween which moves the moving object in a retraction direction which is an axial direction toward the first end portion. The control makes it possible to return the moving object to an initial position after the launch of the underwater payload and before the next launch, by utilization of the plurality of conduit coils.

For example, in the case where the moving object includes the induction coil, the main-circuit control section preferably controls the operation of each of the plurality of main circuits such that the main circuits pass electric currents through the conduit coils corresponding to the main circuits, respectively, to generate the axial first magnetic field and to thereby pass an electric current in the induction coil to generate the second magnetic field in an axial direction opposite to the direction of the first magnetic field, the interaction between the first magnetic field and the second magnetic field causing the moving object and the induction coil forming the first magnetic field to repulse each other so as to move the moving object in the advance direction.

In this case, it is more preferable that the return-circuit control section controls the operation of the return circuit such that the return circuit passes an electric current through the return coil to generate the third magnetic field and to thereby pass an electric current through the return coil of the moving object to cause a fourth magnetic field in an axial direction opposite to the direction of the third magnetic field, the third magnetic field and the fourth magnetic field making an interaction therebetween which causes the moving object and the return coil forming the third magnetic field to repulse each other so as to decelerate the moving object.

Besides, the main-circuit control section preferably controls the operation of the plurality of main circuits such that the plurality of main circuits pass electric currents through the conduit coils corresponding to the main circuits, respectively, to thereby generate an axial fifth magnetic field and to pass an electric current through the induction coil of the moving object to cause a sixth magnetic field in an axial direction opposed to the direction of the fifth magnetic field, the fifth magnetic field and the sixth magnetic field making an interaction therebetween which causes the moving object and the conduit coil forming the fifth magnetic field to repulse each other so as to move the moving object in a retraction direction which is an axial direction toward the first end portion.

Alternatively, in the case where the moving object includes the magnetic material, it is preferable that the main-circuit control section controls the operation of each of the plurality of main circuits such that the main circuits pass electric currents through the conduit coils corresponding to the main circuits, respectively, to generate the first magnetic field and to thereby cause in the magnetic material the second magnetic field in the axial direction same as the direction of the first magnetic field, the interaction between the first magnetic field and the second magnetic field causing the moving object and the induction coil forming the first magnetic field to attract each other so as to move the moving object in the advance direction.

In this case, it is more preferable that the return-circuit control section controls the operation of the return circuit such that the return circuit passes an electric current through the return coil to generate the third magnetic field and to thereby cause in the magnetic material a fourth magnetic field in the axial direction same as the direction of the third magnetic field, the third magnetic field and the fourth magnetic field making an interaction therebetween which causes the moving object and the return coil forming the third magnetic field to attract each other so as to decelerate the moving object.

Besides, the main-circuit control section preferably controls the operation of the plurality of main circuits such that the plurality of main circuits pass electric currents through the conduit coils corresponding to the main circuits, respectively, to thereby generate an axial fifth magnetic field and to thereby cause in the magnetic material a sixth magnetic field in the axial direction same as the direction of the fifth magnetic field, the fifth magnetic field and the sixth magnetic field making an interaction therebetween which causes the moving object and the conduit coil forming the fifth magnetic field to attract each other so as to move the moving object in a retraction direction which is an axial direction toward the first end portion.

Preferably, the launching apparatus for underwater payloads further includes a fixing mechanism switchable between a state of fixing the moving object at a predetermined position in the conduit and a state of releasing the moving object. The fixing mechanism can effectively restrain the moving object from being moved in the advance direction by flow of the water or the like before the electric current passed through the conduit coils moves the moving object.

This application is based on Japanese Patent application No. 2015-124059 filed in Japan Patent Office on Jun. 19, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An apparatus for launching an underwater payload with water pressure, the launching apparatus for underwater payloads comprising:
   a launch tube in which an underwater payload is loaded;
   a conduit including a first end portion, which is one of axially opposite ends, a communicating portion located in a position separate from the first end portion and communicating with the launch tube, and a second region extending axially between the communicating portion and a second end portion which is an axial end portion of the conduit opposite to the first end portion, the conduit being filled with water;
   a plurality of conduit coils disposed around the conduit in a first region between the communicating portion and the first end portion, the plurality of conduit coils aligned axially of the conduit;
   a plurality of main circuits configured to pass an electric current through the conduit coils, respectively, so as to generate an axial first magnetic field in the conduit;
   a main-circuit control section configured to control an operation of each of the plurality of main circuits;
   a moving object disposed in the conduit and including a magnetic material or an induction coil, the moving object being configured to move in the conduit in an advance direction from the first end portion toward the communicating portion to thereby generate, in the launch tube, water pressure for launching the underwater payload
   a return coil disposed in the second region;
   a return circuit configured to pass an electric current through the return coil so as to generate an axial third magnetic field in the conduit; and
   a return-circuit control section configured to control operation of the return circuit, wherein
   the main-circuit control section controls the operation of each of the plurality of main circuits such that the main circuits pass electric currents through the conduit coils corresponding to the main circuits, respectively, to generate the axial first magnetic field and to thereby cause an axial second magnetic field in the moving object, the first magnetic field and the second magnetic field making an interaction which moves the moving object in the advance direction, and the return-circuit control section controls the operation of the return circuit such that the return circuit passes an electric current through the return coil to generate the third magnetic field and to cause an axial fourth magnetic field in the moving object, the third magnetic field and the fourth magnetic field making an interaction therebetween which decelerates the moving object.

2. The launching apparatus for underwater payloads according to claim 1, further comprising a plurality of sensors disposed in respective positions corresponding to the plurality of conduit coils so as to be capable of detecting the moving object, wherein the main-circuit control section controls the operation of the main circuits on the basis of information on the position of the moving object acquired from the plurality of sensors.

3. The launching apparatus for underwater payloads according to claim 1, wherein the main-circuit control section controls the operation of the plurality of main circuits such that the plurality of main circuits pass electric currents through the conduit coils corresponding to the main circuits, respectively, to thereby generate an axial fifth magnetic field and to cause an axial sixth magnetic field in the moving object, the fifth magnetic field and the sixth magnetic field making an interaction therebetween which moves the moving object in a retraction direction which is an axial direction toward the first end portion.

4. The launching apparatus for underwater payloads according to claim 1, further comprising a fixing mechanism switchable between a state of fixing the moving object at a predetermined position in the conduit and a state of releasing the moving object.

5. An apparatus for launching an underwater payload with water pressure, the launching apparatus for underwater payloads comprising:
   a launch tube in which an underwater payload is loaded;
   a conduit including a first end portion, which is one of axially opposite ends, a communicating portion located in a position separate from the first end portion and communicating with the launch tube, and a second region extending axially between the communicating portion and a second end portion which is an axial end portion of the conduit opposite to the first end portion, the conduit being filled with water;
   a plurality of conduit coils disposed around the conduit in a first region between the communicating portion and the first end portion, the plurality of conduit coils aligned axially of the conduit;
   a plurality of main circuits configured to pass an electric current through the conduit coils, respectively, so as to generate an axial first magnetic field in the conduit;
   a main-circuit control section configured to control an operation of each of the plurality of main circuits;
   a moving object disposed in the conduit and including a magnetic material or an induction coil, the moving object being configured to move in the conduit in an advance direction from the first end portion toward the communicating portion to thereby generate, in the launch tube, water pressure for launching the underwater payload;
   a return coil disposed in the second region;

a return circuit configured to pass an electric current through the return coil so as to generate an axial third magnetic field in the conduit; and a return-circuit control section configured to control operation of the return circuit, wherein the main-circuit control section controls the operation of each of the plurality of main circuits such that the main circuits pass electric currents through the conduit coils corresponding to the main circuits, respectively, to generate the axial first magnetic field and to thereby cause an axial second magnetic field in the moving object, the first magnetic field and the second magnetic field making an interaction which moves the moving object in the advance direction, the moving object includes the induction coil, and the main-circuit control section controls the operation of each of the plurality of main circuits such that the main circuits pass electric currents through the conduit coils corresponding to the main circuits, respectively, to generate the axial first magnetic field and to thereby pass an electric current in the induction coil to generate the second magnetic field in an axial direction opposite to the direction of the first magnetic field, the interaction between the first magnetic field and the second magnetic field causing the moving object and the induction coil forming the first magnetic field to repulse each other so as to move the moving object in the advance direction, and the return-circuit control section controls the operation of the return circuit such that the return circuit passes an electric current through the return coil to generate the third magnetic field and to thereby pass an electric current through the return coil of the moving object to cause a fourth magnetic field in an axial direction opposite to the direction of the third magnetic field, the third magnetic field and the fourth magnetic field making an interaction therebetween which causes the moving object and the return coil forming the third magnetic field to repulse each other so as to decelerate the moving object.

6. The launching apparatus for underwater payloads according to claim 5, wherein the main-circuit control section controls the operation of the plurality of main circuits such that the plurality of main circuits pass electric currents through the conduit coils corresponding to the main circuits, respectively, to thereby generate an axial fifth magnetic field and to pass an electric current through the induction coil of the moving object to cause a sixth magnetic field in an axial direction opposed to the direction of the fifth magnetic field, the fifth magnetic field and the sixth magnetic field making an interaction therebetween which causes the moving object and the conduit coil forming the fifth magnetic field to repulse each other so as to move the moving object in a retraction direction which is an axial direction toward the first end portion.

7. An apparatus for launching an underwater payload with water pressure, the launching apparatus for underwater payloads comprising:
   a launch tube in which an underwater payload is loaded;
   a conduit including a first end portion, which is one of axially opposite ends, a communicating portion located in a position separate from the first end portion and communicating with the launch tube, and a second region extending axially between the communicating portion and a second end portion which is an axial end portion of the conduit opposite to the first end portion, the conduit being filled with water;

a plurality of conduit coils disposed around the conduit in a first region between the communicating portion and the first end portion, the plurality of conduit coils aligned axially of the conduit;

a plurality of main circuits configured to pass an electric current through the conduit coils, respectively, so as to generate an axial first magnetic field in the conduit;

a main-circuit control section configured to control an operation of each of the plurality of main circuits;

a moving object disposed in the conduit and including a magnetic material or an induction coil, the moving object being configured to move in the conduit in an advance direction from the first end portion toward the communicating portion to thereby generate, in the launch tube, water pressure for launching the underwater payload;

a return coil disposed in the second region;

a return circuit configured to pass an electric current through the return coil so as to generate an axial third magnetic field in the conduit; and a return-circuit control section configured to control operation of the return circuit, wherein the main-circuit control section controls the operation of each of the plurality of main circuits such that the main circuits pass electric currents through the conduit coils corresponding to the main circuits, respectively, to generate the axial first magnetic field and to thereby cause an axial second magnetic field in the moving object, the first magnetic field and the second magnetic field making an interaction which moves the moving object in the advance direction, the moving object includes the magnetic material, and the main-circuit control section controls the operation of each of the plurality of main circuits such that the main circuits pass electric currents through the conduit coils corresponding to the main circuits, respectively, to generate the first magnetic field and to thereby cause in the magnetic material the second magnetic field in the axial direction same as the direction of the first magnetic field, the interaction between the first magnetic field and the second magnetic field causing the moving object and the induction coil forming the first magnetic field to attract each other so as to move the moving object in the advance direction, and the return-circuit control section controls the operation of the return circuit such that the return circuit passes an electric current through the return coil to generate the third magnetic field and to thereby cause in the magnetic material a fourth magnetic field in the axial direction same as the direction of the third magnetic field, the third magnetic field and the fourth magnetic field making an interaction therebetween which causes the moving object and the return coil forming the third magnetic field to attract each other so as to decelerate the moving object.

8. The launching apparatus for underwater payloads according to claim 7, wherein the main-circuit control section controls the operation of the plurality of main circuits such that the plurality of main circuits pass electric currents through the conduit coils corresponding to the main circuits, respectively, to thereby generate an axial fifth magnetic field and to thereby cause in the magnetic field a sixth magnetic field in the axial direction same as the direction of the fifth magnetic field, the fifth magnetic field and the sixth magnetic field making an interaction therebetween which causes the moving object and the conduit coil forming the fifth magnetic field to attract each other so as to move the moving object in a retraction direction which is an axial direction toward the first end portion.

* * * * *